(12) United States Patent
Miyoshi et al.

(10) Patent No.: US 8,060,693 B2
(45) Date of Patent: Nov. 15, 2011

(54) DATA PROCESSING APPARATUS, DATA PROCESSING METHOD, AND COMPUTER READABLE MEDIUM

(75) Inventors: Nobukazu Miyoshi, Kanagawa (JP); Tomokazu Kaneko, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 556 days.

(21) Appl. No.: 11/646,234

(22) Filed: Dec. 28, 2006

(65) Prior Publication Data

US 2007/0271427 A1 Nov. 22, 2007

(30) Foreign Application Priority Data

May 18, 2006 (JP) ................................. 2006-138468

(51) Int. Cl.
*G06F 12/00* (2006.01)

(52) U.S. Cl. ........ 711/112; 711/103; 711/154; 711/158; 707/206

(58) Field of Classification Search .................. 711/112
See application file for complete search history.

(56) References Cited

U.S. PATENT DOCUMENTS

| | | | | |
|---|---|---|---|---|
| 5,881,266 A * | 3/1999 | Matsumoto | ..... | 711/134 |
| 5,913,215 A * | 6/1999 | Rubinstein et al. | ..... | 707/10 |
| 6,545,916 B2 * | 4/2003 | Fukuda et al. | ..... | 365/185.33 |
| 6,983,351 B2 * | 1/2006 | Gibble et al. | ..... | 711/159 |
| 2003/0077074 A1 | 4/2003 | Okamoto et al. | | |
| 2004/0027603 A1 | 2/2004 | Ueda et al. | | |
| 2006/0010301 A1 * | 1/2006 | Yagawa | ..... | 711/163 |
| 2008/0031591 A1 | 2/2008 | Okamoto et al. | | |

FOREIGN PATENT DOCUMENTS

| | | |
|---|---|---|
| JP | A 09-284572 | 10/1997 |
| JP | A-2002-251819 | 9/2002 |
| JP | A 2004-056347 | 2/2004 |
| JP | A 2004-157758 | 6/2004 |
| JP | A-2004-288140 | 10/2004 |
| JP | A 2005-018567 | 1/2005 |
| JP | A-2005-086575 | 3/2005 |
| JP | A-2005-184202 | 7/2005 |
| JP | A-2006-053721 | 2/2006 |

OTHER PUBLICATIONS

Japanese Office Action issued in Japanese Patent Application No. 2006-138468 on Jun. 21, 2011 (with translation).
Aug. 30, 2011 Decision of Refusal issued in Japanese patent application No. 2006-138468 (with translation).

* cited by examiner

*Primary Examiner* — Matthew Bradley
(74) *Attorney, Agent, or Firm* — Oliff & Berridge, PLC (57) ABSTRACT

A data processing apparatus includes: a storage that has first to $n^{th}$ storage areas and stores data in the first to $n^{th}$ storage areas; a specific area erasion section that erases the data stored in the first storage area of the storage; a area erasion section that erases the data stored in at least one of the second to $n^{th}$ storage areas; and a erasion control section that controls the specific area erasion section and the area erasion section so that erasion of the specific area erasion section takes precedence over erasion of the area erasion section, wherein n is natural number.

12 Claims, 9 Drawing Sheets

DATA PROCESSING APPARATUS, DATA PROCESSING METHOD, AND COMPUTER READABLE MEDIUM

BACKGROUND

1. Technical Field

This invention relates to a data processing apparatus, a data processing method, and computer readable medium that storages a data processing program for erasing data having a plurality of data areas.

2. Related Art

In recent years, a hard disk as a storage medium for retaining image data, etc., has been used in a copier, a printer, etc.; however, retained information in the discarded hard disk may be left. Thus, the necessity for erasing unnecessary information in the hard disk grows and a large number of techniques are disclosed as for information erasion techniques in hard disk. National Security Agency (NSA) recommendation method (overwrite with random numbers at the first and second times and overwrite with fixed values at the third time) is generally known as a data erasion method in hard disk. As another method, a method of increasing the number of overwrite times to more enhance the erasion effect is generally known.

SUMMARY

According to an aspect of the present invention, a data processing apparatus includes: a storage that has first to $n^{th}$ storage areas and stores data in the first to $n^{th}$ storage areas; a specific area erasion section that erases the data stored in the first storage area of the storage; a area erasion section that erases the data stored in at least one of the second to $n^{th}$ storage areas; and a erasion control section that controls the specific area erasion section and the area erasion section so that erasion of the specific area erasion section takes precedence over erasion of the area erasion section, wherein n is natural number.

BRIEF DESCRIPTION OF THE DRAWINGS

Exemplary embodiment of the present invention will be described in detail based on the following figures, wherein.

DETAILED DESCRIPTION

Referring now to the accompanying drawings, there are shown preferred embodiments of the invention.

An outline of a first embodiment of the invention will be discussed.

A data processing apparatus 20 for overwriting data in storage for erasing the data divides overwrite erasion processing into a plurality of processing steps for execution. To begin with, only a part of data is overwritten and then the remaining portions are overwritten. Data encrypted in a CBC (Cipher Block Chaining) mode, for example, is stored across sectors on hard disk. In the CBC mode, data is encrypted based on encrypted data in the preceding block for each encryption processing unit (block) and thus if data only in the top block is erased, it is hard to decrypt cipher data in the subsequent blocks. That is, unless the preceding block is referenced, the following block cannot be reproduced, and the CBC mode is not suited to random access. In the embodiment, as the first overwrite erasion processing, only the top one of the sectors where data whose overwrite is specified is stored is overwritten N times for erasion. Subsequently, as the second overwrite erasion processing, the sectors other than the top sector are overwritten N times for erasion. The presence or absence of execution of the second overwrite erasion processing and the overwrite erasion processing at the second and later times can be selected.

The embodiments described below can be applied to a scanner, a printer, a copier, a FAX, a multiple function processing machine (having a print function, a scan function, a FAX function, a copy function, etc.), etc., and are more effective when data of a comparatively large capacity such as an image is stored in storage. As the storage and the area to be erased, a hard disk and a sector are mainly illustrated in the description to follow.

Figure 1:
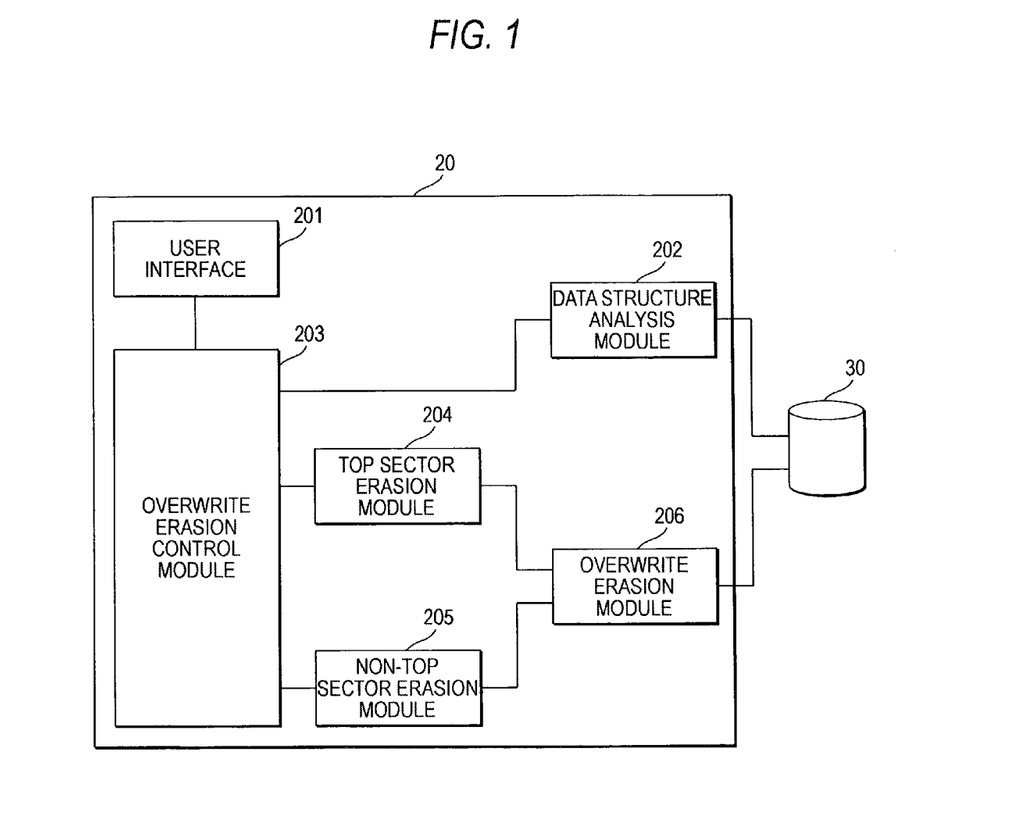
FIG. 1 is a schematic block diagram to illustrate a data processing apparatus.

FIGS. 1 to 4 show the first embodiment of the invention. FIG. 1 shows a conceptual module configuration example of the first embodiment of the invention.

A module refers to a generally and logically detachable part of software, hardware, etc. Therefore, the module in the embodiment means not only a module in a program, but also a module in the hardware configuration. Therefore, the embodiment described below also serves as the description of an apparatus, a method, and a program. Modules are almost in a one-to-one correspondence with functions; however, in implementation, one module may be one program or two or more modules may make up one program or two or more programs may make up one module. Two or more modules may be executed by one apparatus or one module may be executed in two or more apparatus in a distributed or parallel environment. In the description to follow, the term "connection" contains not only physical connection, but also logical connection.

The apparatus is not only provided by connecting a plurality of computers, hardware, units, etc., through a network, etc., but also implemented as one apparatus.

The data processing apparatus 20 is connected to an HDD 30. Data stored across sectors is stored on the HDD 30. The data may be one piece or may be two or more pieces. The sectors can be classified into a specific sector where information that must be subjected first to reproduction processing is stored (for example, top sector) and other sectors.

The data processing apparatus 20 contains a user interface 201, a data structure analysis module 202, an overwrite erasion control module 203, a top sector erasion module 204, a non-top sector erasion module 205, and an overwrite erasion module 206.

The user interface 201 is connected to the overwrite erasion control module 203 for displaying the processing result, etc., on a display for the operator using the data processing apparatus 20 and accepting a command from the operator. As the command, any of commands of erasure of only the top sector, specification of the sector to be overwritten for erasure, specification of the top sector and other sectors, specification of the number of overwrite times for each of the top sector and other sectors, specification of the erasure timing for other sectors, and specification of the presence or absence of processing of the non-top sector erasure module 205 can be given.

The data structure analysis module 202 is connected to the HDD 30 and the overwrite erasure control module 203 for reading and analyzing information stored on the HDD 30, thereby analyzing the data structure stored on the HDD 30. For example, the fact that the stored data is encrypted in the CBC mode, the location of the top sector of the data, and the like are turned out. The data structure analysis module 202 transfers the analysis result to the overwrite erasure control module 203.

The overwrite erasure module 206 is connected to the HDD 30, the top sector erasure module 204, and the non-top sector erasure module 205 for erasing a sector in the HDD 30 according to a command of the top sector erasure module 204 or the non-top sector erasure module 205. The erasure is overwrite erasure and may be executed only once or may be executed more than once.

The top sector erasure module 204 is connected to the overwrite erasure control module 203 and the overwrite erasure module 206 for commanding the overwrite erasure module 206 to erase the top sector according to a command from the overwrite erasure control module 203.

The non-top sector erasure module 205 is connected to the overwrite erasure control module 203 and the overwrite erasure module 206 for commanding the overwrite erasure module 206 to erase sectors other than the top sector (namely, the second and later sectors) according to a command from the overwrite erasure control module 203.

The overwrite erasure control module 203 is connected to the user interface 201, the data structure analysis module 202, the top sector erasure module 204, and the non-top sector erasure module 205 for receiving a command of the operator from the user interface 201 or the data structure from the data structure analysis module 202 and controlling the top sector erasure module 204 or the non-top sector erasure module 205 to erase data. The overwrite erasure control module 203 controls the top sector erasure module 204 and the non-top sector erasure module 205 as follows: Causing erasure of the top sector erasure module 204 to take precedence over erasure of the non-top sector erasure module 205; erasure of only the top sector erasure module 204 (namely, no execution of erasure of the non-top sector erasure module 205); determination of the sector to be erased by the top sector erasure module 204; determination of the sector to be erased by the non-top sector erasure module 205; determination of the number of overwrite erasure times executed by the top sector erasure module 204 or the non-top sector erasure module 205; determination of the erasure timing of the non-top sector erasure module 205; determination as to whether or not erasure of the non-top sector erasure module 205 is to be executed; classifying a plurality of sectors to be erased by the non-top sector erasure module 205 into layers for erasure; and alternate execution of erasure of the top sector erasure module 204 and erasure of the non-top sector erasure module 205. The control may be performed according to a command from the operator through the user interface 201 or the analysis result of the data structure analysis module 202 or may be previously defined in the overwrite erasure control module 203.

Figure 2:
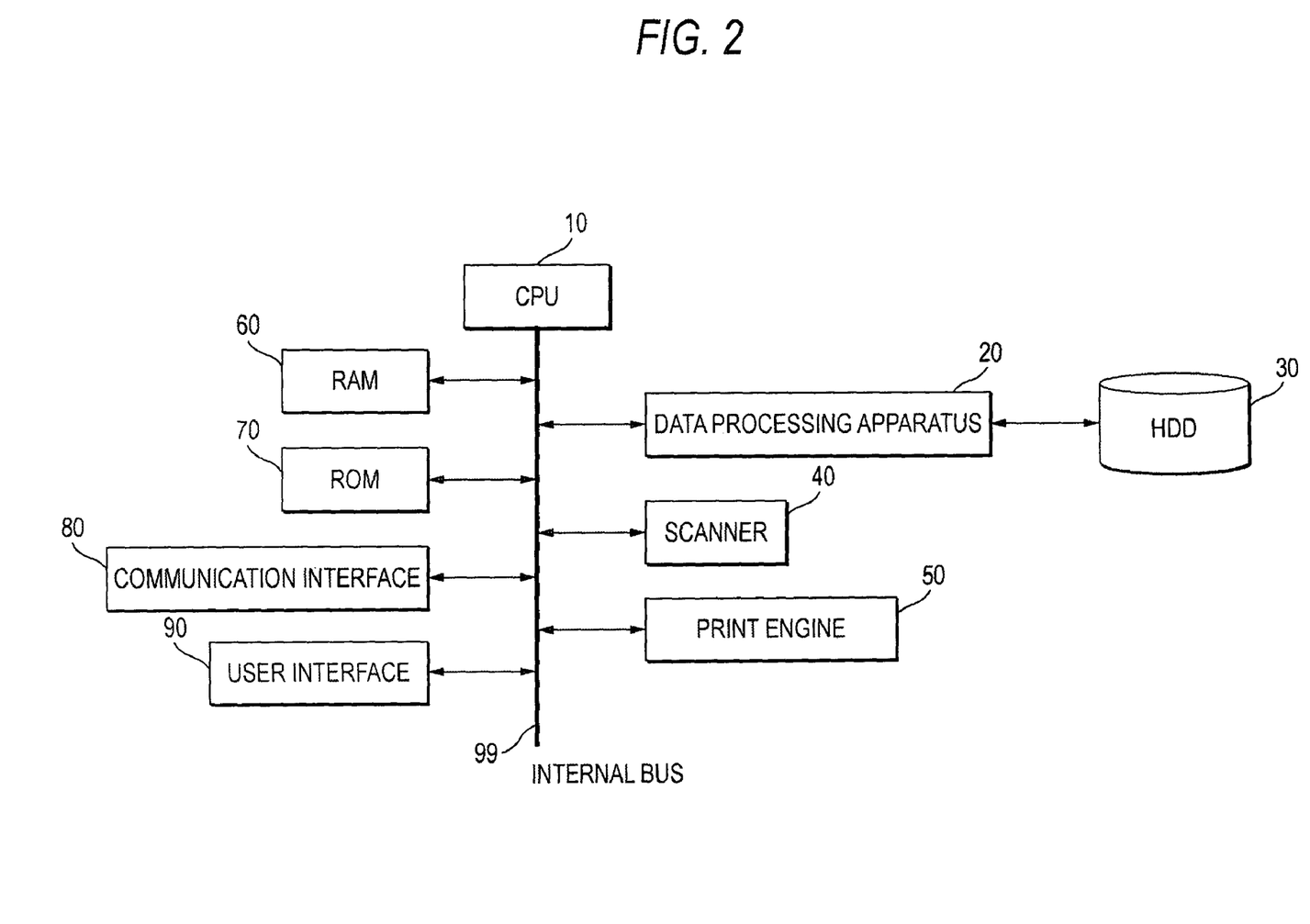
FIG. 2 is a schematic block diagram to illustrate hardware of the data processing apparatus.

FIG. 2 is a schematic block diagram to illustrate hardware of the image processing apparatus implementing the embodiment. The hardware has a CPU 10, the data processing apparatus 20, the HDD 30, a scanner 40, a print engine 50, RAM 60, ROM 70, a communication interface 80, a user interface 90, and an internal bus 99. The CPU 10 controls the whole image processing apparatus. The data processing apparatus 20 stores and reads data in and from the HDD 30 according to a command from the CPU 10, etc. In the embodiment, the data processing apparatus 20 mainly executes data erasure in the HDD 30. The RAM 60 stores a program, data, and image data. The ROM 70 stores fixed programs and data and mainly stores information required when power of the image processing apparatus is turned on. The HDD 30 is connected to the data processing apparatus 20 for storing image data stored in the RAM 60. The communication interface 80 performs communication processing with a communication network and executes transmission and reception to and from other machines. The user interface 90 accepts operation of the operator of the image processing apparatus and produces display for the operator according to a command from the CPU 10. The scanner 40 inputs image data into the RAM 60. The print engine 50 prints out the image data in the RAM 60, etc. The components are connected to the internal bus 99 for performing processing in conjunction with each other.

Next, the function and the operation will be discussed.

Figure 3:
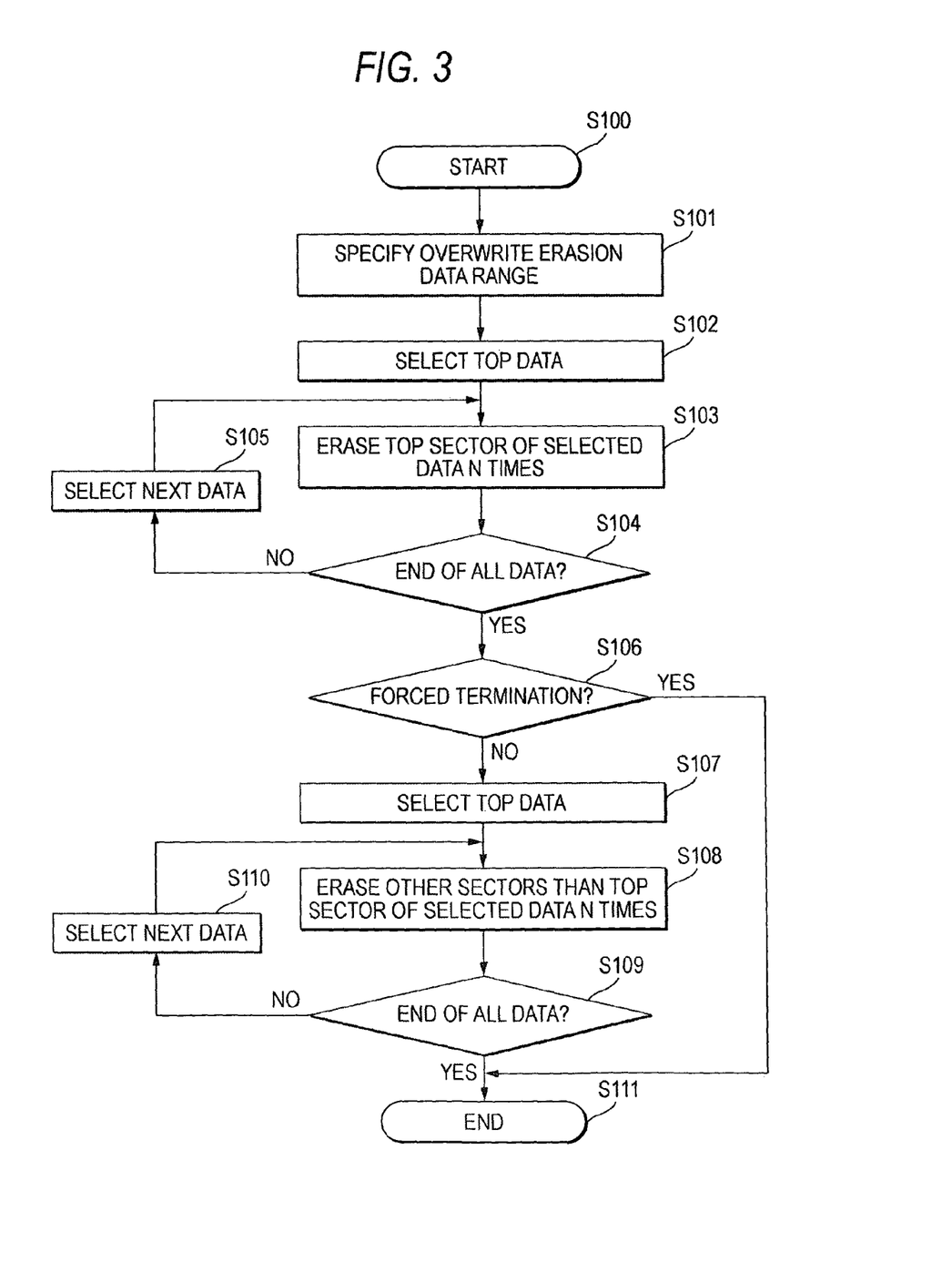
FIG. 3 is a flowchart of a first erasion processing example.

An erasure processing algorithm in the first embodiment will be discussed with FIG. 3.

At step S101, the overwrite erasure control module 203 specifies the range of overwrite erasure data. The specification may be made according to a command from the operator through the user interface 201 or the analysis result of the data structure analysis module 202 or may be previously defined in the overwrite erasure control module 203. One cluster of data is specified, such as copied image data, printed-out image data, faxed image data, or all data in the HDD 30, for example.

At step S102, the overwrite erasure control module 203 selects the top data. That is, if a plurality of pieces of data exist, the top data is selected; if the data to be erased is only one piece, the data is selected.

At step S103, the top sector of the selected data is erased N times. This means that the top sector of the data to be erased is completely erased by overwrite erasure.

At step S104, whether or not step S103 has been executed for all data is determined. If one data piece only is specified as the data range specified at step S101, step S103 is executed only once. If a plurality of pieces of data are specified, step S103 is executed as many times as the number of the data pieces. When step S103 has been executed for all data, the process goes to step S106.

At step S105, when erasure processing is executed for a plurality of pieces of data, the next data to be erased is selected. Then, the process returns to step S103.

At step S106, whether or not the process is to be forcibly terminated is determined. As steps S101 to S105 are executed, the top sectors of all data are erased. Since the data stored on the HDD 30 is data encrypted in the CBC mode, the necessity for erasing other sectors is low. Then, to terminate the erasure processing in a short time, the process may be terminated here. The specification may be made according to a command from the operator through the user interface 201 or may be previously defined in the overwrite erasure control module 203.

At step S107, the top data is selected as at step S102.

At step S108, other sectors than the top sector of the selected data are erased N times. This means that other sectors than the top sector of the data to be erased are completely erased by overwrite erasure.

At step S109, whether or not step S108 has been executed for all data is determined. If it is determined that step S108 has been executed for all data, the erasion processing is terminated (step S111).

At step S110, when erasion processing is executed for a plurality of pieces of data, the next data to be erased is selected. Then, the process returns to step S108.

The erasion situation for each sector when the erasion processing is performed according to the flowchart of FIG. 3 will be discussed with FIG. 4.

Figure 4A:
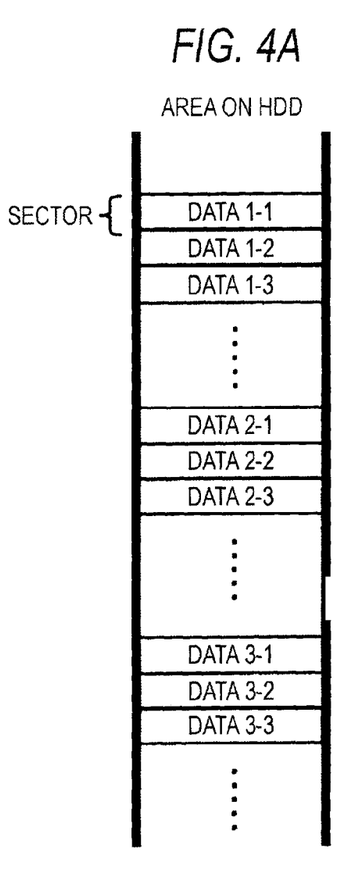
FIGS. 4A to 4C are schematic representations to schematically illustrate data erasion in hard disk by performing the first erasion processing.

FIG. 4A shows the data structure in the HDD 30 before erasion processing is started. It shows that three pieces of data (data 1, data 2, and data 3) exist and three sectors are for each data piece (for example, data 1-1, data 1-2, and data 1-3 for data 1).

Figure 4B:
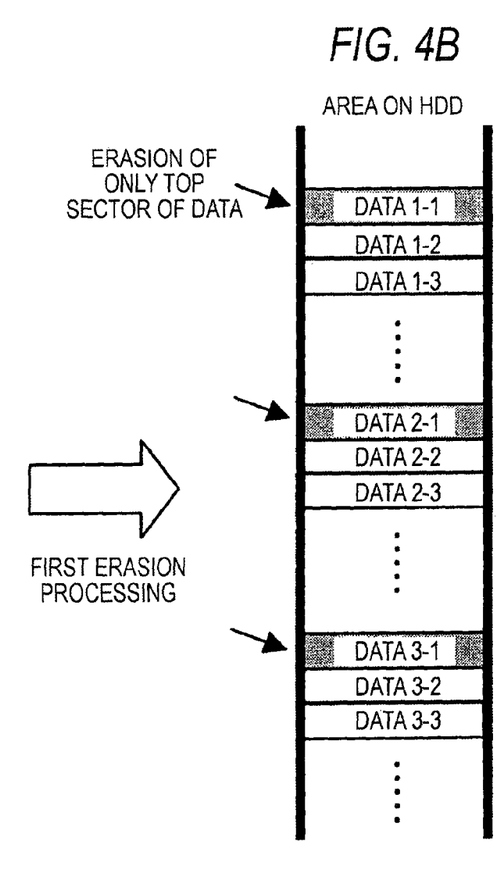

FIG. 4B shows the result of the first erasion processing. The result is produced at the termination of the processing at steps S100 to S105 in the flowchart of FIG. 3, namely, indicates the state in which the top sectors of the data (data 1-1, data 2-1, and data 3-1) are overwritten N times for erasion. If forced termination is applied at step S106 in FIG. 3 (YES at step S106), the erasion processing terminates in this state. In this case, the erasion processing terminates early because only the top sectors rather than all sectors are erased. For example, if each data piece is 100 sectors, the erasion processing terminates in one-hundredth the time taken for erasing all sectors. Since the top sectors are erased for the CBC data, it becomes very difficult to reproduce the original data and the risk of data leakage decreases.

Figure 4C:
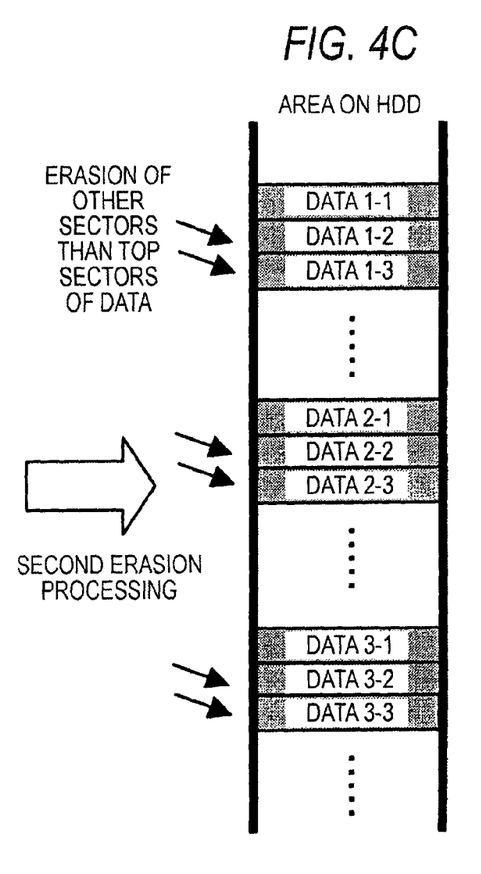

FIG. 4C shows the result of the second erasion processing. The result is produced at the termination of the processing at steps S107 to S111 in the flowchart of FIG. 3. Then, all sectors of all data have been erased according to the National Security Agency (NSA) recommendation method.

In the embodiment, only the top sectors of data are first erased completely by performing the first overwrite erasion processing, so that a plurality of pieces of data can be erased in a short time to the level at which they cannot be read. For the user who wants more safety, the remaining sectors can also be successively erased by performing the second overwrite erasion processing. The second overwrite erasion processing can be executed at a predetermined timing (immediately, when a successive job does not exist, or the like). This timing can be adjusted at step S106 in FIG. 3.

In the embodiment, if the erasion processing is interrupted while it is being executed, it becomes hard to decrypt the descriptions of unerased data as compared with the related arts.

Figure 5:
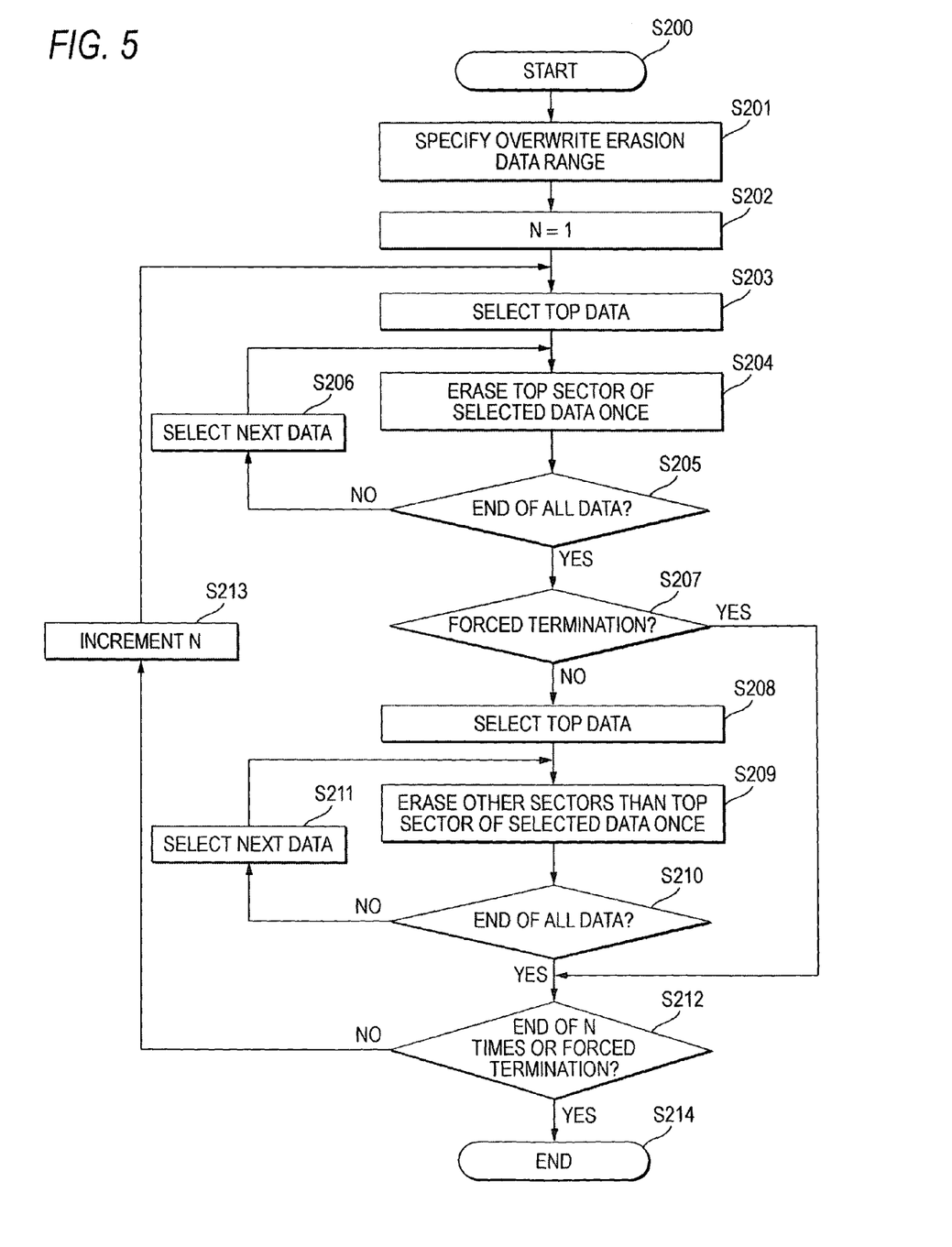
FIG. 5 is a flowchart of a second erasion processing example.

A second embodiment of the invention will be discussed with FIGS. 5 and 6. Although a conceptual module configuration example is similar to that in the first embodiment (FIG. 1), mainly the function of a part of an overwrite erasion control module 203 is used. A hardware example of a data processing apparatus 20 is also similar to that in the first embodiment (FIG. 2). Modules identical with or similar to those of the first embodiment will not be discussed again.

An outline of the second embodiment of the invention will be discussed.

The data processing apparatus 20 for overwriting data in storage for erasing the data divides overwrite erasion processing into a plurality of processing steps for execution. To begin with, only a part of data is overwritten and then the remaining portions are overwritten. Data encrypted in a CBC mode, for example, is stored across sectors on hard disk. In the CBC mode, data is encrypted based on encrypted data in the preceding block for each encryption processing unit (block) and thus if data only in the top block is erased, it is hard to decrypt cipher data in the subsequent blocks. In the embodiment, as the first overwrite erasion processing, only the top ones of the sectors where data whose overwrite is specified is stored are overwritten once for erasion. Subsequently, as the second overwrite erasion processing, the sectors other than the top sectors are overwritten once for erasion. Further, the first overwrite erasion processing is executed up to N times and then the second overwrite erasion processing is executed up to N times and the overwrite erasion processing is terminated. The presence or absence of execution of the second overwrite erasion processing and the overwrite erasion processing at the second and later times can be selected.

The overwrite erasion control module 203 causes a top sector erasion module 204 to once erase the top sectors of all data. Next, the overwrite erasion control module 203 causes a non-top sector erasion module 205 to once erase other sectors than the top sectors of all data. The sequence is repeated N times under the control of the overwrite erasion control module 203. This means that erasion of the top sector erasion module 204 and erasion of the non-top sector erasion module 205 are repeated N times alternately.

An erasion processing algorithm in the second embodiment will be discussed with FIG. 5. For steps similar those in FIG. 3, the corresponding steps are only referenced.

Step S201 is similar to step S101.

At step S202, a variable N is set to 1 for repeating the whole N times.

Step S203 is similar to step S102.

At step S204, the top sector of selected data is erased once. This means that the top sector of the target data is overwritten only once for erasing the sector.

Step S205 is similar to step S104.

Step S206 is similar to step S105. Then, the process returns to step S204.

Step S207 is similar to step S106. As the processing has been performed so far, the top sectors of all data are overwritten once for erasion. Therefore, it is made possible to perform erasion processing for the top data of all data earlier than that in the first embodiment. The time is one-Nth the time taken for the erasion processing in the first embodiment.

Step S208 is similar to step S107.

At step S209, other sectors than the top sector of the selected data are erased once. This means that other sectors than the top sector of the target data are overwritten only once for erasing the sectors.

Step S210 is similar to step S109.

Step S211 is similar to step S110. Then, the process returns to step S209.

At step S212, the value of the variable N is checked and if the value is N, the processing is terminated, or the processing may be forcibly terminated at this point in time.

At step S213, the variable N is incremented by one. Then, the process returns to step S203.

The erasion situation for each sector when the erasion processing is performed according to the flowchart of FIG. 5 will be discussed with FIG. 6.

Figure 6A:
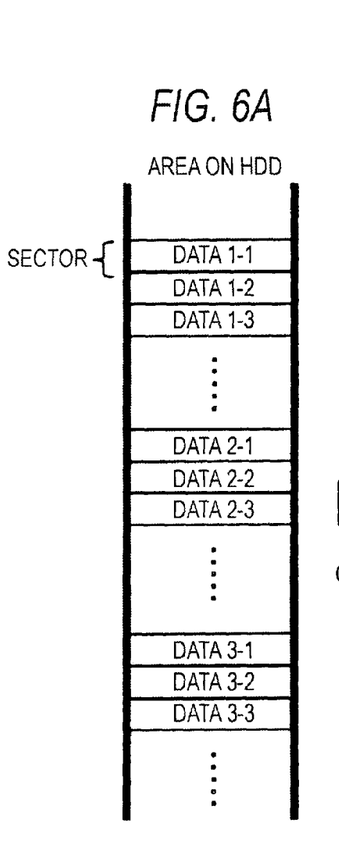
FIGS. 6A to 6C are schematic representations to schematically illustrate data erasion in hard disk by performing the second erasion processing.

FIG. 6A is similar to FIG. 4A.

Figure 6B:
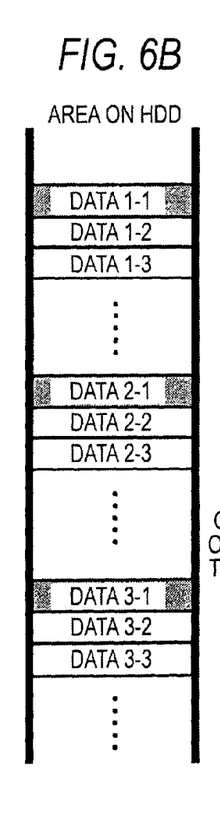

FIG. 6B shows the situation in which the top sectors are erased once. It is the result of performing the processing at steps S203 to S206 when the variable N is 1 in the flowchart of FIG. 5.

Figure 6C:
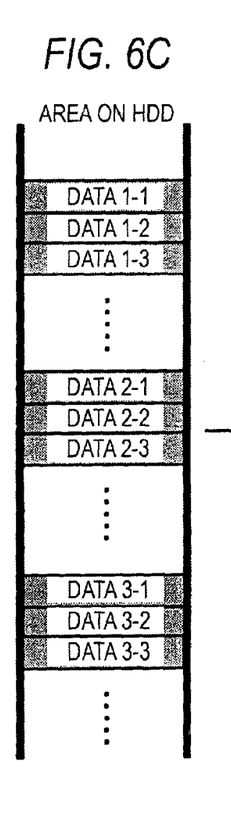

FIG. 6C shows the situation in which other sectors than the top sectors are erased once. It is the result of performing the processing at steps S208 to S211 when the variable N is 1 in the flowchart of FIG. 5. Then, all sectors of all data have been overwritten once for erasion.

While the variable N is incremented (step S213), the state in FIG. 6B and the state in FIG. 6C are repeated N times. Finally, the state becomes the same as that in FIG. 4C.

In the second embodiment, the time to completion of erasion of the top sectors is prolonged as compared with that in the first embodiment; however, as the remaining sectors are erased early, the whole data can be erased in a well-balanced manner.

Figure 7:
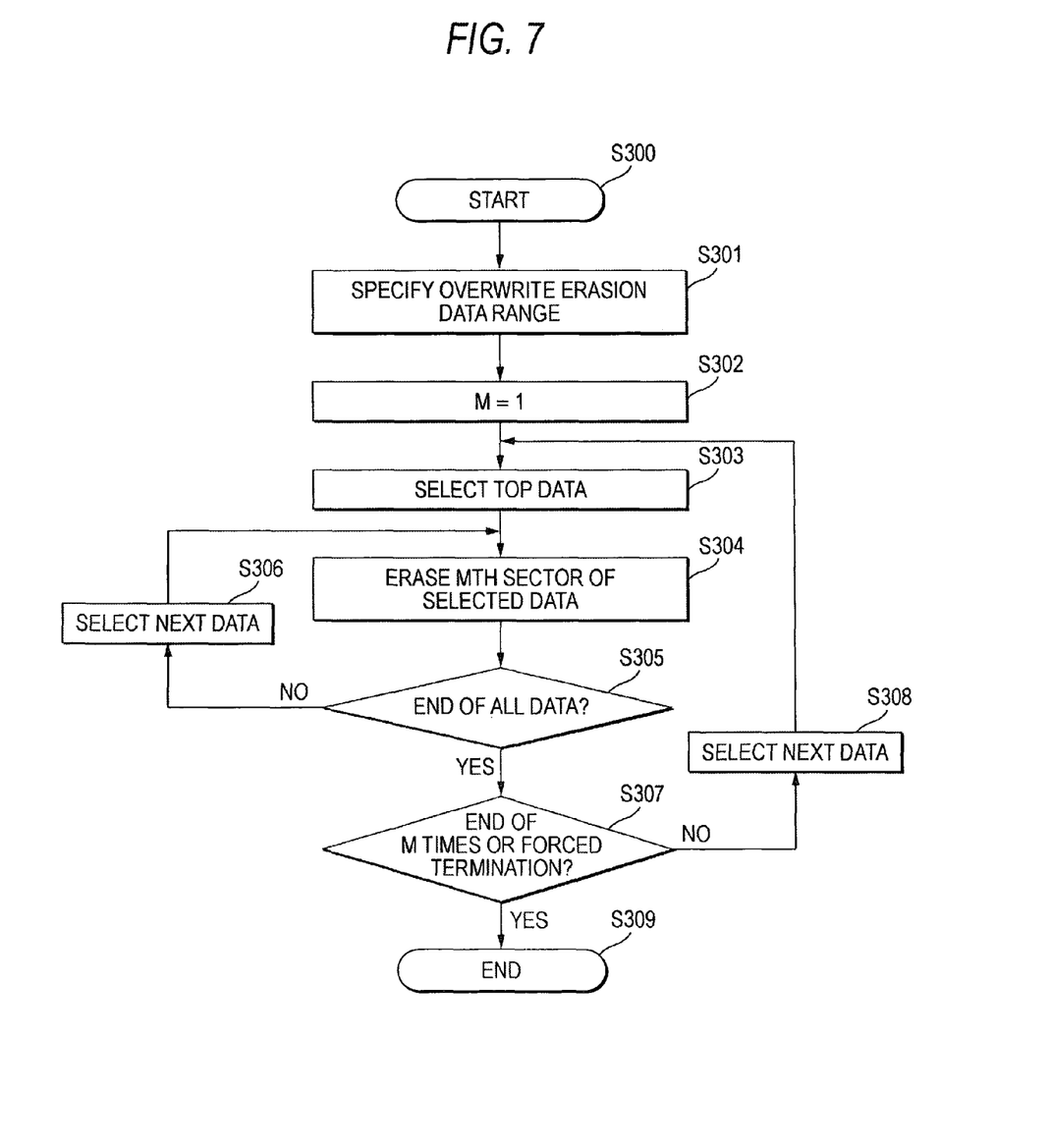
FIG. 7 is a flowchart of a third erasion processing example.

A third embodiment of the invention will be discussed with FIGS. 7 and 8. Although a conceptual module configuration example is similar to that in the first embodiment (FIG. 1), mainly the function of a part of an overwrite erasion control module 203 is used. A hardware example of a data processing apparatus 20 is also similar to that in the first embodiment (FIG. 2). Modules identical with or similar to those of the first embodiment will not be discussed again.

An outline of the third embodiment of the invention will be discussed.

The data processing apparatus 20 for overwriting data in storage for erasing the data divides overwrite erasion processing into a plurality of processing steps for execution. In the embodiment, as the first overwrite erasion processing, only the top ones of the sectors where data whose overwrite is specified is stored are overwritten for erasion. Subsequently, as the second overwrite erasion processing, only the second sectors are overwritten for erasion. After this, likewise, the third sectors to the last sectors are overwritten in order for erasion by performing the third overwrite erasion processing to the last overwrite erasion processing. The presence or absence of execution of the second overwrite erasion processing and the later can be selected.

The overwrite erasion control module 203 completely erases the top sectors of all data using a top sector erasion module 204 and completely erases the subsequent sectors one sector at a time using a non-top sector erasion module 205. The data encrypted in a CBC mode is made hierarchical in order starting at the top sector and unless reproduction of data in the high-level sector terminates, the data in the low-order sector cannot be reproduced. In the third embodiment, for a hierarchical data structure, data is erased for each level of the hierarchy.

An erasion processing algorithm in the third embodiment will be discussed with FIG. 7. For steps similar those in FIG. 3, the corresponding steps are only referenced.

Step S301 is similar to step S101.

At step S302, a variable M is set to 1 for repeating the whole M times (the maximum number of sectors of all data).

Step S303 is similar to step S102.

At step S304, the Mth sector of selected data is completely erased. This means that the Mth sector of the target data is overwritten N times for erasing the sector. At the initial time (M=1), the top sector is erased.

Step S305 is similar to step S104.

Step S306 is similar to step S105.

At step S307, the value of the variable M is checked and if the value is M, the processing is terminated, or the processing may be forcibly terminated at this point in time.

At step S308, the variable M is incremented by one. Then, the process returns to step S303.

The erasion situation for each sector when the erasion processing is performed according to the flowchart of FIG. 7 will be discussed with FIG. 8.

Figure 8A:
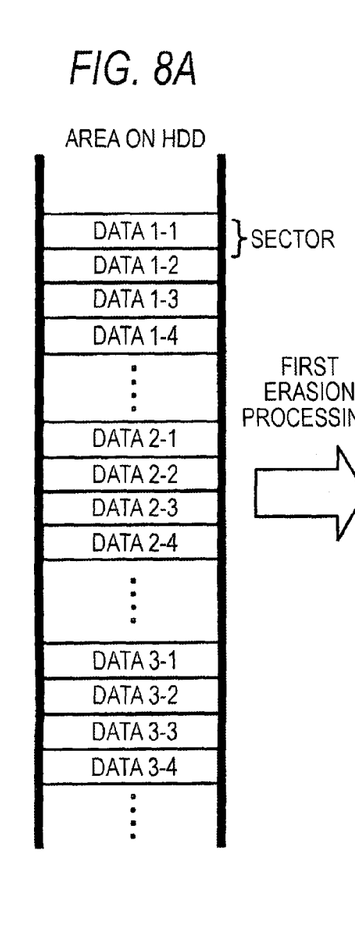
FIGS. 8A to 8D are schematic representations to schematically illustrate data erasion in hard disk by performing the third erasion processing.

FIG. 8A is similar to FIG. 4A.

Figure 8B:
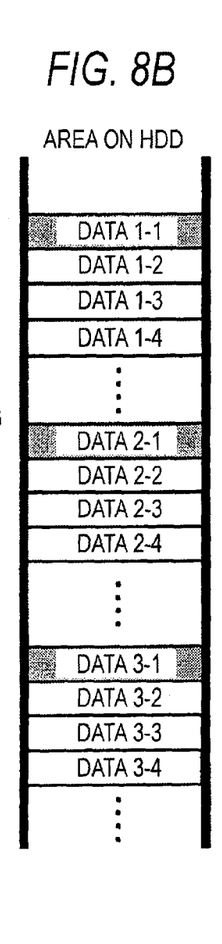

FIG. 8B shows the state in which the first erasion processing terminates. That is, it is the result of performing the processing at steps S303 to S307 when M=1 in the flowchart of FIG. 7.

Figure 8C:
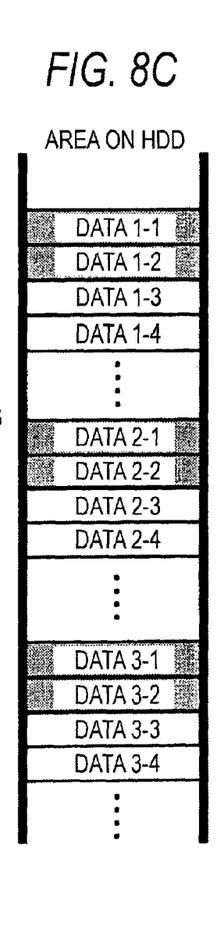

FIG. 8C shows the state in which the second erasion processing terminates. That is, it is the result of performing the processing at steps S303 to S307 when M=2 in the flowchart of FIG. 7.

Figure 8D:
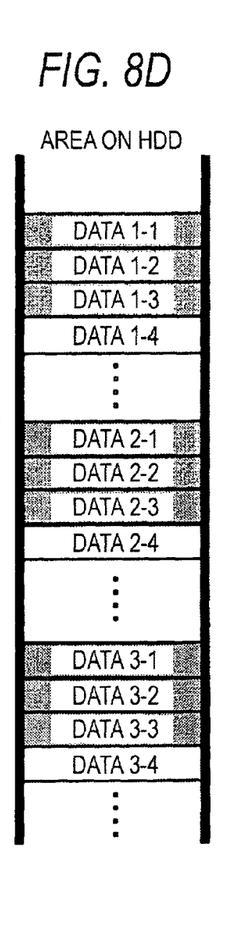

FIG. 8D shows the state in which the third erasion processing terminates. That is, it is the result of performing the processing at steps S303 to S307 when M=3 in the flowchart of FIG. 7.

After this, it is followed by the fourth sector, . . . and the processing is repeated to the last sector (Mth sector). Since the data pieces may differ in the number of sectors, complete erasion of the data with a smaller number of sectors terminates earlier.

In the third embodiment, only the top sectors of data are first erased by performing the first overwrite erasion processing, so that a plurality of pieces of data can be erased in a short time to the level at which they cannot be read. For the user who wants more safety, the remaining sectors can also be successively erased by performing the second and later overwrite erasion processing. The second and later overwrite erasion processing can be executed at a predetermined timing (immediately, when a successive job does not exist, or the like).

In the embodiment, if the erasion processing is interrupted while it is being executed, it becomes hard to decrypt the descriptions of unerased data as compared with the related arts.

As a plurality of erasion processes, the sectors are erased in order starting at the top sector of data, but the invention is not limited to the mode. Any of the second and later sectors may be erased in a plurality of erasion processes and the sector to be erased may be previously specified for each of a plurality of erasion processes.

Figure 9:
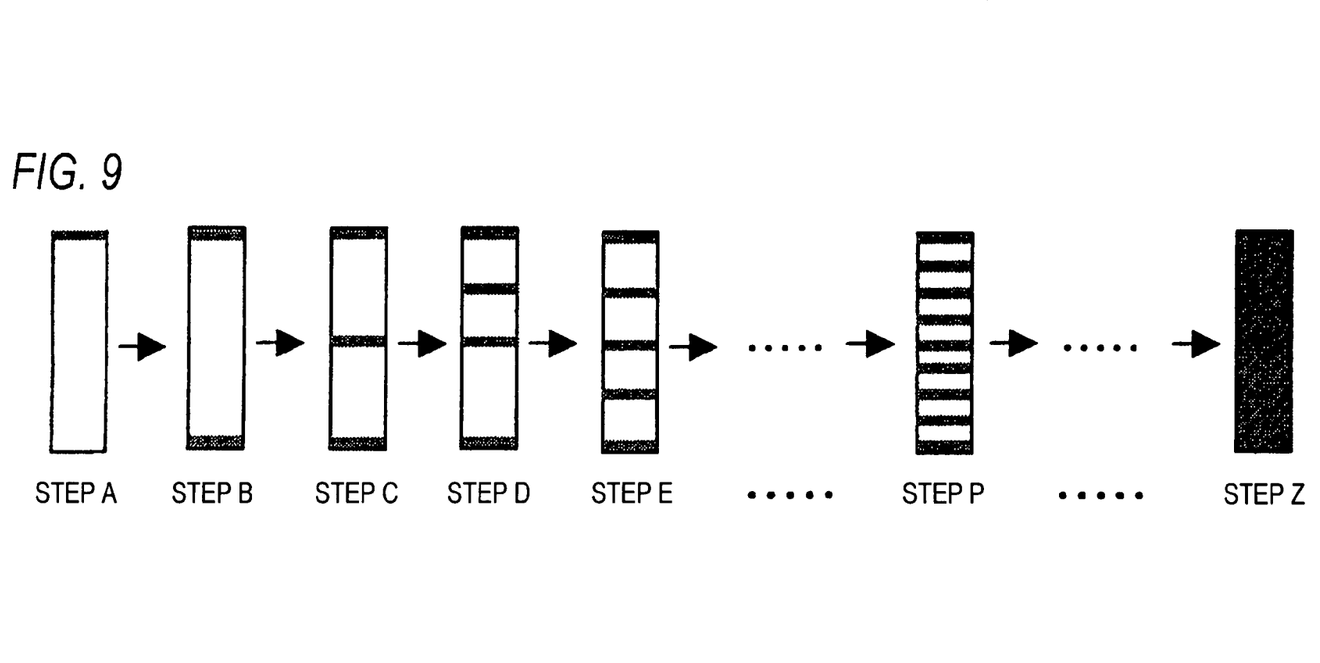
FIG. 9 schematically illustrates data erasion in hard disk by performing erasion processing.

For example, as shown in FIG. 9, in all erasion of hard disk, etc., the whole hard disk may be erased equally in such a manner that first, data on the hard disk is erased in the order of the top address (Step A), the last address (Step B), and intermediate address (Step C) and subsequently the hard disk is divided into two portions and data is erased in the order of intermediate address of first division (Step D), intermediate address of second division (Step E), . . . .

In the embodiment, the erasion processing of the data encrypted in the CBC mode has been described, but the invention can also be applied to unencrypted data. For example, it can be applied to compressed image data which needs to be reproduced in order in decompression processing, etc., image processing data, data storing necessary information for reproduction processing in a header portion, and the like.

The top sector of data is erased as the first erasion processing, but the invention is not limited to the mode. Any sector may be erased first if it is a sector required for reproduction and the first sector to be erased may be previously specified.

In the embodiments described above, the number of overwrite erasion times of the top sector and that of other sectors are set to the same N, but the number of overwrite times of the top sector may be set to a larger number than N and that of other sectors may be set smaller than the number.

In the embodiments described above, the top sector is erased taking precedence over other sectors, but the sector to be erased may be any if the sector stores the data required first when reproduction processing is performed.

In the embodiments described above, sectors are shown as hard disk area, but data may be erased in track units, block units, or page units. Although one sector is adopted as the unit area to erase data, two or more sectors are adopted as the unit area to erase data.

In the embodiments described above, overwrite erasion is executed in sector units for hard disk by way of example, but the invention can also be applied to overwrite erasion of data stored in any other non-volatile memory such as flash memory or volatile memory. In this case, overwrite erasion in smaller block units is also possible.

In the embodiments described above, data is erased in sector units, but may be erased in file units or job units.

Erasion is not necessarily limited to clearing to zero and is to invalidate the currently stored data.

The described program can also be stored on a storage medium, in which case the invention can also be grasped as follows, for example:

A computer readable record medium recording a data processing program for causing a data processing apparatus to implement:
a storage function of storing data having a plurality of storage areas;
a specific area erasion function of erasing a specific area of the stored data;
an area erasion function of erasing any other area than the specific area; and
an erasion control function of controlling the specific area erasion function and the area erasion function so that erasion of the specific area erasion function takes precedence over erasion of the area erasion function.

A computer readable record medium recording a data processing program for causing a data processing apparatus to implement:
a storage function of storing data having a plurality of storage areas; and
a specific area erasion function of erasing only a specific area of the stored data.

A computer readable record medium recording a data processing program for causing a data processing apparatus to implement:
a storage function of storing a plurality of pieces of data each piece having a plurality of storage areas;
a specific area erasion function of erasing a specific area of each of the stored data pieces;
an area erasion function of erasing other areas than the specific areas; and
an erasion control function of controlling the specific area erasion function and the area erasion function so that erasion of the specific area erasion function takes precedence over erasion of the area erasion function.

A computer readable record medium recording a data processing program for causing a data processing apparatus to implement:
a storage function of storing a plurality of pieces of data each piece having a plurality of storage areas;
a specific area erasion function of erasing specific areas of the stored data;
an area erasion function of erasing other areas than the specific areas; and
an erasion control function of controlling the specific area erasion function and the area erasion function so that erasion of the specific area erasion function and erasion of the area erasion function are executed alternately.

A computer readable record medium recording a data processing program for causing a data processing apparatus to implement:
a storage function of storing a plurality of pieces of data each piece having a plurality of storage areas; and
a specific area erasion function of erasing only a specific area of each of the stored data pieces.

The expression "computer readable record medium recording a program" is used to mean a record medium read by a computer recording a program, used to install and execute a program, to distribute a program, etc.

The record media includes storage media such as "DVD-R, DVD-RW, DVD-RAM, etc.," of digital versatile disk (DVD) and standard laid down in DVD Forum, "DVD+R, DVD+RW, etc.," of standard laid down in DVD+RW, read-only memory (CD-ROM), CD recordable (CD-R), CD rewritable (CD-RW), etc., of compact disk (CD), magneto-optical disk, flexible disk (FD), magnetic tape, hard disk, read-only memory (ROM), electrically erasable and programmable read-only memory (EEPROM), flash memory, random access memory (RAM), etc., for example.

The described program or a part thereof can be recorded in any of the described record media for retention, distribution, etc. The described program or a part thereof can also be transmitted by communications using a transmission medium such as a wired network used with a local area network, a metropolitan area network (MAN), a wide area network (WAN), the Internet, an intranet, an extranet, etc., or a wireless communication network or a combination thereof, etc., for example, and can also be carried over a carrier wave.

Further, the described program may be a part of another program or may be recorded in a record medium together with a different program.

What is claimed is:

1. A data processing apparatus comprising:
a storage that has first to $m^{th}$ memory blocks, each memory block having first to $n^{th}$ sectors and stores data in the first to $n^{th}$ sectors;
a specific area erasion section that erases all of the data stored in the first sector of each memory block in the first to $m^{th}$ memory blocks, the first sector in each memory block in the first to $m^{th}$ memory blocks being erased, and the second to $n^{th}$ sectors of each memory block being sequentially erased after all of the first sectors in each memory block in the first to $m^{th}$ memory blocks are erased;
an area erasion section that erases the data stored in at least one of the second to $n^{th}$ sectors; and
an erasion control section that controls the specific area erasion section and the area erasion section so that erasion of the specific area erasion section takes precedence over erasion of the area erasion section,
wherein n and m are natural numbers and n is greater than 1 and m is greater than 1.

2. The data processing apparatus as claimed in claim 1, wherein the erasion control section determines the data stored in the first sector to be erased by the specific area erasion section in response to a data structure of the data stored in the storage.

3. The data processing apparatus as claimed in claim 1, which comprises: a specific area specification section that specifies the data stored in the first sector of the storage to be erased by the specific area erasion section.

4. The data processing apparatus as claimed in claim 1, which comprises: an area specification section that specifies the data stored in at least one of the second to $n^{th}$ sectors to be erased by the area erasion section.

5. The data processing apparatus as claimed in claim 1, wherein
the specific area erasion section and the area erasion section overwrite another data a plurality of times to erase the data stored in the first sector of the storage and the data stored in at least one of the second to $n^{th}$ sectors of the storage, respectively, and the data processing apparatus comprises: a number-of-overwrite-times specification section that specifies the number-of-overwrite-times.

6. The data processing apparatus as claimed in claim 1, which comprises: an erasion timing specification section that specifies timing of erasion of the data stored in the first sector of the storage.

7. The data processing apparatus as claimed in claim 1, wherein the erasion control section specifies whether or not the area erasion section is allowed to erase the data stored in the first sector of the storage.

8. The data processing apparatus as claimed in claim 1, wherein the data stored in at least one of the second to $n^{th}$ sectors are classified into hierarchical layers and erased.

9. A data processing apparatus comprising:
a storage that has first to $m^{th}$ memory blocks, each memory block having first to $n^{th}$ sectors and stores data pieces in the first to $n^{th}$ sectors;
a specific area erasion section that erases all of the data pieces stored in the first sector of each memory block in the first to $m^{th}$ memory blocks, the first sector in each memory block in the first to $m^{th}$ memory blocks being erased, and the second to $n^{th}$ sectors of each memory block being sequentially erased after all of the first sectors in each memory block in the first to $m^{th}$ memory blocks are erased;
an area erasion section that erases the data pieces stored in at least one of the second to $n^{th}$ sectors; and
an erasion control section that controls the specific area erasion section and the area erasion section so that erasion of the specific area erasion section takes precedence over erasion of the area erasion section,
wherein n and m are natural numbers and n is greater than 1 and m is greater than 1.

10. A data processing apparatus comprising:
a storage that has first to $m^{th}$ memory blocks, each memory block having first to $n^{th}$ sectors and stores data pieces in the first to $n^{th}$ sectors;
a specific area erasion section that erases all of the data pieces stored in the first sector of each memory block in the first to $m^{th}$ memory blocks, the first sector in each memory block in the first to $m^{th}$ memory blocks being erased, and the second to $n^{th}$ sectors of each memory block being sequentially erased after all of the first sectors in each memory block in the first to $m^{th}$ memory blocks are erased;
an area erasion section that erases the data pieces stored in at least one of the second to $n^{th}$ sectors; and
an erasion control section that controls the specific area erasion section and the area erasion section so that erasion of the specific area erasion section and erasion of the area erasion section are executed alternately,
wherein n and m are natural numbers and n is greater than 1 and m is greater than 1.

11. A data processing method comprising:
of data stored in a storage device having first to $m^{th}$ memory blocks, each memory block having first to $n^{th}$ sectors, first erasing the first sector in each memory block in the first to $m^{th}$ memory blocks, and sequentially erasing the second to $n^{th}$ sectors of each memory block after all of the first sectors in each memory block in the first to $m^{th}$ memory blocks are erased;
second erasing the data stored in at least one of the second to $n^{th}$ sectors; and
controlling the first and second erasing so that the first erasing takes precedence over the second erasing,
wherein n and m are natural numbers and n is greater than 1 and m is greater than 1.

12. A non-transitory computer readable storage medium storing a program causing a computer to execute a process for erasing data stored in a storage device having first to $m^{th}$ memory blocks, each memory block having first to $n^{th}$ sectors, process comprising:
first erasing the first sector in each memory block in the first to $m^{th}$ memory blocks, and sequentially erasing the second to $n^{th}$ sectors of each memory block after all of the first sectors in each memory block in the first to $m^{th}$ memory blocks are erased;
second erasing the data stored in at least one of the second to $n^{th}$ sectors; and
controlling the first and second erasing so that the first erasing takes precedence over the second erasing,
wherein n and m are natural numbers and n is greater than 1 and m is greater than 1.

* * * * *